United States Patent [19]

Holmberg

[11] Patent Number: 5,127,189

[45] Date of Patent: Jul. 7, 1992

[54] PROPAGATION TRAY

[76] Inventor: Douglas A. Holmberg, 1321 N. Valrico, Valrico, Fla. 33954

[21] Appl. No.: 554,442

[22] Filed: Jul. 19, 1990

[51] Int. Cl.$^5$ .............................................. A01G 9/02
[52] U.S. Cl. ............................................ 47/87; 47/86
[58] Field of Search ........................ 47/87, 86, 77, 73

[56] References Cited

U.S. PATENT DOCUMENTS

| 2,599,853 | 6/1952 | McClain | 47/86 |
| 3,889,416 | 6/1975 | Bergeron | 47/86 |
| 3,931,694 | 1/1976 | Krikorian | 47/87 |
| 3,949,523 | 4/1976 | Lehtipuu | 47/77 |
| 4,389,814 | 6/1983 | Andreason | 47/73 |
| 4,753,037 | 6/1988 | Whitcomb | 47/73 |
| 4,962,855 | 10/1990 | Holmquist | 47/86 |
| 5,016,548 | 5/1991 | Ito | 47/77 |

FOREIGN PATENT DOCUMENTS

| 633293 | 1/1928 | France | 47/73 |
| 1511256 | 5/1978 | United Kingdom | 47/87 |

Primary Examiner—Henry E. Raduazo
Attorney, Agent, or Firm—Arthur W. Fisher, III

[57] ABSTRACT

A propagation tray configured to receive a plurality of seedlings or the like comprising a tray member having an outer peripheral ledge formed about the periphery thereof and plurality of elongated frustum conical propagation cells each having a centrally disposed aperture formed in the upper portion thereof to receive individual seedlings formed inwardly of the outer peripheral ledge and a drainage aperture and cell support surface formed on the lower portion thereof such that the seedlings disposed within the plurality of elongated frustum conical propagation cells are provided drainage and air pruning through the drainage apertures while supported on the ground or other supporting surface by the cell support surfaces.

5 Claims, 3 Drawing Sheets

PROPAGATION TRAY

BACKGROUND OF THE INVENTION

1. Field Of The Invention

A propagation tray comprising a tray member having a plurality of propagation cells formed therein, each of the plurality of propagation cells comprising a cell member having a drainage aperture formed on the lower portion thereof and a cell support surface formed on the lower end thereof.

2. Description Of The Prior Art

It is well known that roots require both air and water to grow properly. In addition, waste gases produced by the plant roots and/or microbial action should be permitted to escape from the root environment.

U.S Pat. No. 4,658,542 relates to a portable growing system for propagating seedlings or root cuttings comprising an upper propagation tray configured to receive a plurality of seedlings or root cuttings and a lower support bench configured to support the upper propagation tray above the ground or other supporting surface. The upper propagation tray comprises a tray member having an outer peripheral support ledge formed about the periphery thereof and a plurality of propagation cells each having a centrally disposed aperture formed therein to receive individual seedlings or root cuttings; while the lower support bench comprising a pair of side walls held in fixed spaced relationship relative to each other by a pair of end walls and a lattice floor.

U.S. Pat. No. 4,173,097 relates to containers for the growth of plants including indentations in the bottom and/or side(s) of the container to increase the surface area of the part of the container in contact with the growing media, reduce the average distance a molecule must diffuse in the growing media from roots before encountering a media-air interface and reduce the proportion of relatively water saturated growing media in the containers.

U.S. Pat. No. 4,446,652 discloses a unitary flower pot having a water reservoir at the bottom thereof defined by a bottom wall and a soil support plate positioned above the bottom wall. The soil support plate is hinged to the pot by means of plastic resin from which the pot is formed. The soil support plate and pot are formed from the same material with the support plate at a vertical position in alignment with the axis of the pot so that it can be removed from the mold and then swung downwardly about the hinge to a horizontal position when soil is to be placed in the pot.

U.S. Pat. No. 752,370 shows a flower-pot of clay having a substantially flat bottom with a central drainage-hole and a conically-tapering side wall the inner face of which near the bottom has a greater taper than that of the corresponding outer face and forms a direct junction with the drainage-hole by the inner and outer face intersecting with each other.

U.S. Pat. No. S. 3,315,410 shows a container of fibrous pulp material comprising a bottom having an upwardly and outwardly flaring side wall connected around the periphery of the bottom. The bottom includes a horizontal center portion spaced above the substantially flat plane and a conical portion that extends upwardly from the corner to the horizontal center portion. A drainage aperture extends through the horizontal center portion of the bottom.

SUMMARY OF THE INVENTION

The present invention relates to a propagation tray configured to receive a plurality of seedlings or the like and support the propagation tray above the ground or other supporting surface.

The propagation tray comprises a tray member including an outer peripherial ledge and a plurality of elongated frustum conical propagation cells formed inwardly thereof. Each elongated frustum conical propagation cell comprises an upper centrally disposed aperture and an intermediate potting portion having a drainage aperture and cell support surface formed in the lower portion thereof.

Each elongated frustum conical propagation cell is configured to provide the volume of the media together with the media support, drainage, volume of cell, air pruning, and other structural elements that greatly enhances the growth rate of the seedlings and maximizes the efficient use of space within the greenhouse. The position of the drainage aperture allows for continuous drainage even when the propagation tray is placed on the ground or other support surfaces.

In use, growing media is placed into each elongated frustum conical propagation cell with seedlings or cuttings. Once the trees or plants have grown to the desired size, the trees or plants and the growing media are removed from the propagation tray and transplanted into the ground or into a large container. Because of the width to height ratio, an optimum volume of media is provided with an optimum degree of drainage so that the upper foliar plant growth extending from the individual elongated frustum conical propagation cells may be disposed immediately adjacent the other elongated frustum conical propagation cells without interference, while maximizing desirable root development. Thus, the area of the greenhouse is used to maximum efficiency.

The invention accordingly comprises the features of construction, combination of elements, and arrangements of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
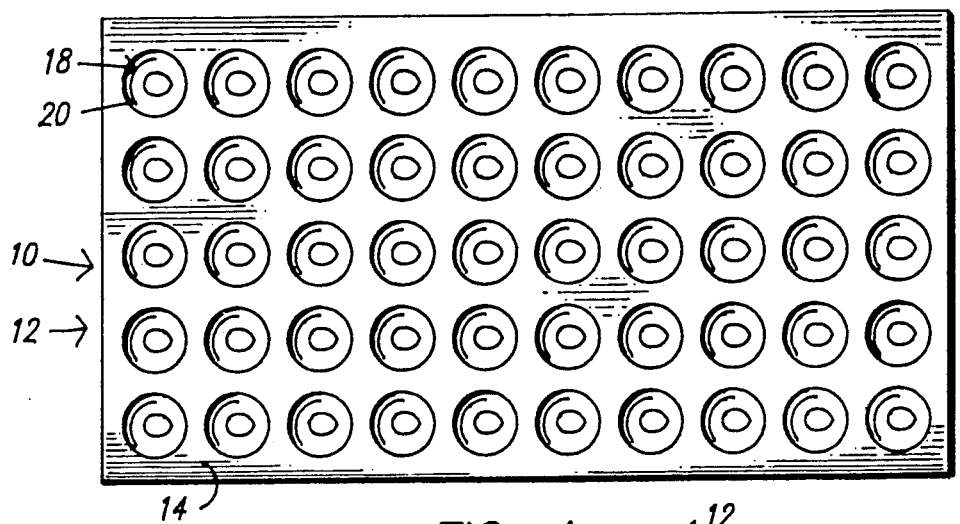
FIG. 1 is a top view of the propagation tray.
Figure 2:
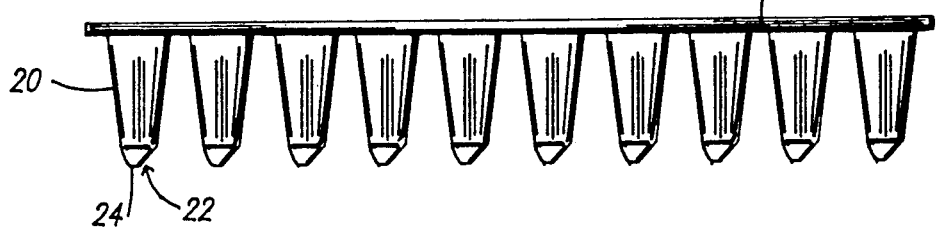
FIG. 2 is a side view of the propagation tray.

As shown in FIGS. 1 and 2, the present invention relates to a propagation tray generally indicated as 10 for propagating seedlings or the like.

The propagation tray 10 comprises a substantially rectangular tray member generally indicated as 12 including an outer peripherial ledge 14 and a plurality of elongated frustum conical propagation cells at least three inches long each generally indicated as 16 formed inwardly of the outer peripherial ledge 14. Each elongated frustum conical propagation cell 16 comprises an upper centrally disposed aperture 18 at least 1 and ½ inches in diameter and an intermediate potting portion 20 having an oval or oblong drainage aperture 22 and an arcuate cell support surface 24 formed in the lower portion thereof.

Figure 3:
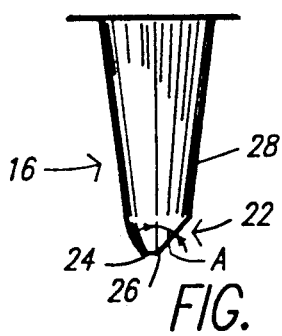
FIG. 3 is a detail side view of the elongated frustum conical propagation cell.

As best shown in FIGS. 2 and 3, the each arcuate cell support surface 24 is disposed in a plane at the lower end of the intermediate potting portion 20 substantially parallel to the plane of the substantially rectangular tray member 12. The plane of each oval or oblong drainage aperture 22 is inclined relative to the plane of each corresponding arcuate cell support surface 24 to intersect opposite ends 26 of the corresponding arcuate cell support surface 24 and the side wall 28 of the corresponding elongated frustum conical propagation cell 20. Of course, the drainage aperture 22 may be square or round.

Figure 6:
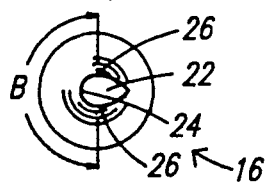
FIG. 6 is a bottom view of the elongated frustrum conical propagation cell of FIG. 3.

As best shown in FIGS. 3 and 6, the included angle A between the plane of each oval or oblong drainage aperture 22 and the plane of each corresponding arcuate cell support surface 24 is substantially 42 degrees but may be varied widely depending on size of cell and the plants needs. The angle B subtended by the arcuate cell support surface 24 is substantially 180 degrees.

Figure 4:
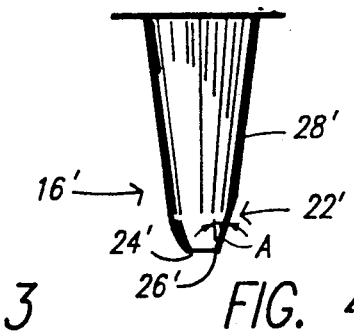
FIG. 4 is a detail side view of an alternate embodiment of the elongated frustrum conical cell.
Figure 7:
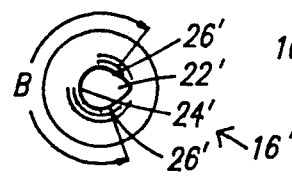
FIG. 7 is a bottom view of the elongated frustum conical propagation cell of FIG. 4.

As best shown in FIGS. 4 and 7, the included angle A' between the plane of each oval or oblong drainage aperture 22' and the plane of each corresponding arcuate cell support surface 24' is substantially 18 degrees. The angle B' subtended by the arcuate cell support surface 24' is substantially 290 degrees.

Figure 5:
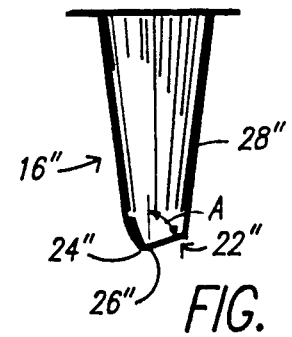
FIG. 5 is a detail side view of another alternate embodiment of the elongated frustum conical cell.
Figure 8:
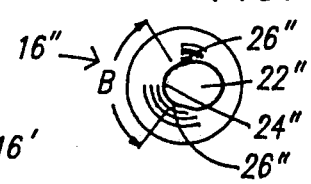
FIG. 8 is a bottom view of the elongated frustum conical propagation cell of FIG. 5.
Figure 9:
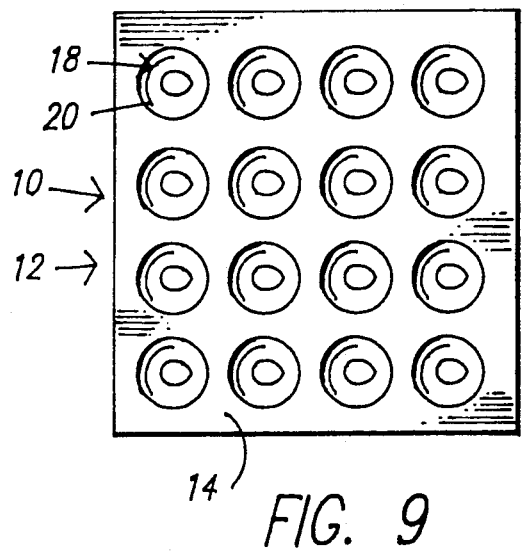
FIG. 9 is a top view of an alternate propagation tray.
Figure 11:
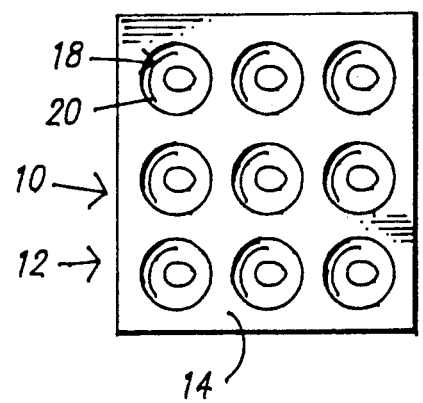
FIG. 11 is a top view of another alternate propagation tray.
Figure 10:
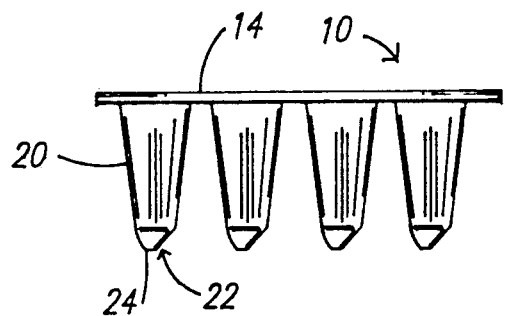
FIG. 10 is a side view of the alternate propagation tray of FIG. 9.
Figure 12:
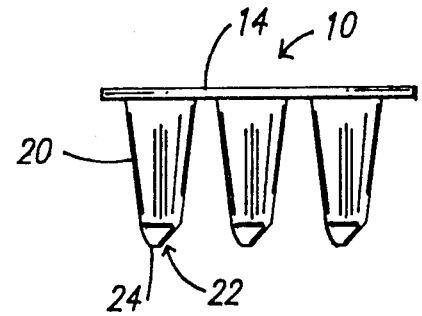
FIG. 12 is a side view of the alternate propagation tray of FIG. 11.

As best shown in FIGS. 5 and 8, the included angle a" between the plane of each oval or oblong drainage aperture 22" and the plane of each corresponding arcuate cell support surface 24" is substantially 73 degrees. Moreover, the angle B" subtended by the arcuate cell support surface 24" is substantially 60 degrees.

A comparison of the relationships shown in FIGS. 3 through 8 shows that the included angle A, A', A" is inversely proportional to the subtended angle B, B', B". Each elongated frustum conical propagation cell 16 is configured to provide the volume of the media together with the media support, drainage, volume of cell, air pruning, and other structural elements that greatly enhances the growth rate of the seedlings or rooting cuttings and maximizes the efficient use of space within the greenhouse. Specifically the length of each elongated frustum conical propagation cell 16 is at least twice the diameter of the upper centrally disposed aperture 18.

FIGS. 9 and 10 and FIGS. 11 and 12 show alternate embodiments of the propagation tray 10 including sixteen and nine elongated frustrum conical propagation cells 16 respectively.

Figure 13:
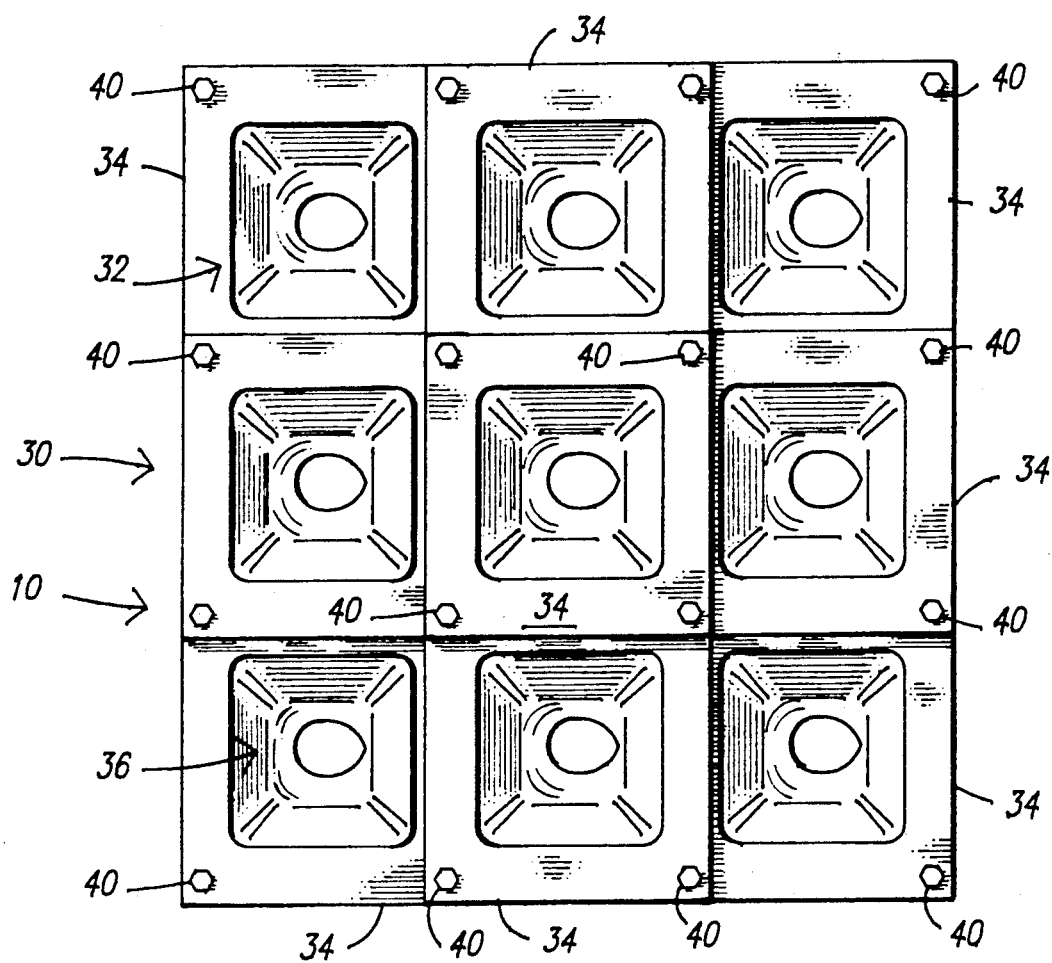
FIG. 13 is a top view of still another alternate propagation tray.
Figure 14:
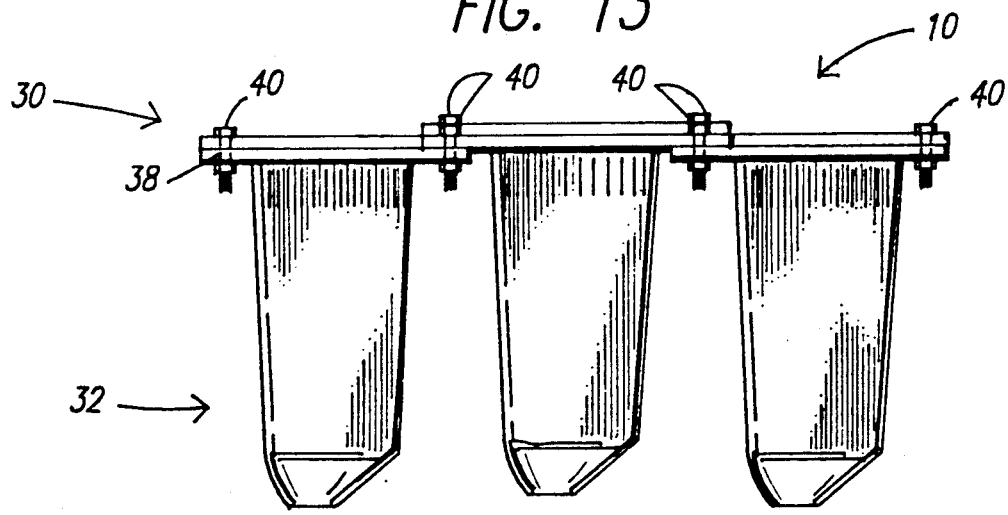
FIG. 14 is a side view of the alternate propagation tray of FIG. 13.

As shown in FIGS. 13 and 14, the propagation tray 10 comprises a substantially rectangular tray 30 cooperatively formed by a plurality of elongated frustrum conical propagation cells each indicated as 32 having a corresponding peripheral ledge 34 formed about the periphery of the corresponding upper centrally disposed aperture 36. Each peripheral ledge 34 has a corresponding plurality of apertures each indicated as 38 to operatively receive a fastener 40 therethrough to detachibly couple adjacent elongated fustrian conical propagation cells 32 together.

In use, growing media is placed into each elongated frustum conical propagation cell 16 with seedlings or cuttings. Once the plants have grown to the desired size, the plants and the growing media are removed from the propagation tray 10 and transplanted into the ground or into a larger container. Because of the width to height ratio, an optimum volume of media is provided with an optimum degree of drainage so that the upper foliar plant growth extending from the individual elongated frustum conical propagation cells 16 may be disposed immediately adjacent the other propagation cells without interference, while maximizing desirable root development. Thus, the area of the greenhouse is used to its maximum efficiency.

The engagement of the arcuate cell support surfaces 24 with the ground or other support surface supports the propagation tray 10 thereon. Since the oval or oblong drainage apertures 22 are formed in the side wall 28 of the individual elongated frustum conical propagation cells 16, drainage and air pruning is permitted while the entire propagation tray 10 rests directly on the ground or other support surface.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A propagation tray configured to receive a plurality of seedlings or the like comprising a tray member having an outer peripheral ledge formed about the periphery thereof and a plurality of propagation cells each comprising an intermediate potting portion to receive a seedling therein, each said intermediate potting portion including a vertically disposed side wall having an aperture formed on the lower portion thereof and a corresponding cell support surface formed on the lower end thereof, each said aperture formed as an inclined plane of truncation formed in each said side wall intersecting said corresponding cell support surface such that the seedlings disposed within said plurality of propagation cells are provided drainage and air pruning through said apertures while supported on the ground or other supporting surface by said cell support surfaces.

2. The propagation tray of claim 1 wherein each said cell support surface is arcuate in configuration.

3. The propagation tray of claim 2 wherein the angle subtended by each said arcuate cell support surface is substantially 180 degrees.

4. The propagation tray of claim 3 wherein each said propagation cell comprises a substantially elongated frustum conical configuration.

5. The propagation tray of claim 1 wherein the length of each said propagation cell is at least twice the diameter of said corresponding centrally disposed aperture.

* * * * *